United States Patent
Zhou et al.

(10) Patent No.: US 12,033,043 B2
(45) Date of Patent: Jul. 9, 2024

(54) IDENTIFICATION METHOD OF URBAN FUNCTIONAL AREAS BASED ON MIXING DEGREE OF FUNCTIONS AND INTEGRATED LEARNING

(71) Applicant: NANJING UNIVERSITY, Nanjing (CN)

(72) Inventors: Chen Zhou, Nanjing (CN); Yunyun Xu, Nanjing (CN); Zhenjie Chen, Nanjing (CN); Manchun Li, Nanjing (CN); Xin Zhao, Nanjing (CN); Zhixin Yu, Nanjing (CN); Haoyang Du, Nanjing (CN); Boqing Wen, Nanjing (CN); Zian Wang, Nanjing (CN); Nan Xia, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 18/031,009

(22) PCT Filed: Jul. 1, 2022

(86) PCT No.: PCT/CN2022/103267
§ 371 (c)(1),
(2) Date: Apr. 10, 2023

(87) PCT Pub. No.: WO2023/050955
PCT Pub. Date: Apr. 6, 2023

(65) Prior Publication Data
US 2024/0013091 A1 Jan. 11, 2024

(30) Foreign Application Priority Data
Jun. 1, 2022 (CN) .......................... 202210621710.0

(51) Int. Cl.
G06N 20/00 (2019.01)

(52) U.S. Cl.
CPC .................................. *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 2014/0278291 A1 | 9/2014 | Zheng et al. | |
| 2020/0065968 A1* | 2/2020 | Sargent | G06V 10/82 |
| 2021/0217117 A1* | 7/2021 | Yang | G06N 20/00 |

FOREIGN PATENT DOCUMENTS

| | | |
|---|---|---|
| CN | 110766589 A | 2/2020 |
| CN | 111178179 A | 5/2020 |

(Continued)

OTHER PUBLICATIONS

Feng, Ying, Zhou Huang, Yaoli Wang, Lin Wan, Yu Liu, Yi Zhang, and Xv Shan. "An SOE-based learning framework using multisource big data for identifying urban functional zones." IEEE Journal of Selected Topics in Applied Earth Observations and Remote Sensing 14 (2021): 7336-7348. (Year: 2021).*

(Continued)

*Primary Examiner* — Casey R. Garner
(74) *Attorney, Agent, or Firm* — Bayramoglu Law Offices LLC (57) ABSTRACT

An identification method of urban functional areas based on mixing degree of functions and integrated learning includes the following steps: 1) performing data acquisition and preprocessing; 2) constructing 10 indicator features of an urban functional area identification system; 3) structuring the indicator features: acquiring, by a spatial statistical tool, the 10 indicator features corresponding to each parcel; 4) constructing an independent variable dataset; 5) labeling response variables; 6) dividing a training dataset into a plurality of training subsets according to the mixing degree of functions; 7) training a Stacking-based integrated learning (Continued)

model; and 8) joining an attribute in one table to another table, so as to complete the identification of the urban functional areas on each parcel. The identification method divides the training dataset by grading the mixing degree of functions, and makes predictions based on the prediction dataset with corresponding mixing degree of functions.

5 Claims, 4 Drawing Sheets

(56)  References Cited

FOREIGN PATENT DOCUMENTS

| CN | 113392859 A | | 9/2021 | |
|---|---|---|---|---|
| CN | 113806419 A | * | 12/2021 | ......... G06F 16/2462 |
| CN | 114003828 A | | 2/2022 | |
| CN | 112579718 A | | 3/2021 | |

OTHER PUBLICATIONS

Hu Xiao Ming, et al., A POI Data-Based Study of the Urban Functional Areas of Chongqing and Their Mix Degree Recognition, Journal of Southwest University (Natural Science Edition), 2021, pp. 164-173, vol. 43, No. 1.

GB/T 21010-2017, Current Land Use Classification, China National Standardization Administration, 2017, pp. 1-10.

GB/T18106-2010, Classification of Retail Formats, China National Standardization Administration, 2021, pp. 1-10.

Technical Regulations on Urban Planning and Management of Jiangsu Province, Jiangsu People's Publishing House, 2011, pp. 1-53.

GB50180-93 Code of Urban Residential Areas Planning & Design, China Urban Planning and Design Research Institute, pp. 4-7, 1-39.

* cited by examiner

IDENTIFICATION METHOD OF URBAN FUNCTIONAL AREAS BASED ON MIXING DEGREE OF FUNCTIONS AND INTEGRATED LEARNING

CROSS REFERENCE TO THE RELATED APPLICATIONS

This application is the national phase entry of International Application No. PCT/CN2022/103267, fled on Jul. 1, 2022, which is based upon and claims priority to Chinese Patent Application No. 202210621710.0, filed on Jun. 1, 2022, the entire contents of which are incorporated herein by reference.

TECHNICAL FIELD

The present disclosure relates to an identification method of urban functional areas based on mixing degree of functions and integrated learning, and belongs to the field of digital information technology.

BACKGROUND

Urban planning is implemented on the basis of the existing urban functional pattern. The past identification methods of urban functional areas have low efficiency and poor dynamic degree. A city is composed of "land", "human", and "human-land relationship", and the role of "human" cannot be ignored.

Urban functional areas have always been the focus of urban planning. In the past, some scholars acquired land use data by remote sensing (RS) and divided urban functions through statistical surveys. Although the RS-based method can capture physical changes in urban functional areas, it cannot present social and economic information related to urban functional areas. In addition, the traditional method has the problems of long data acquisition cycle and large subjectivity.

Some previous studies have combined urban point of interest (urban POI) data with other spatiotemporal big data and used traditional geographic analysis methods such as cluster analysis, population heat map, and density analysis to identify urban functional areas. However, the method is subjective in threshold selection and due to the complex structure of the big data, the traditional geographic analysis methods cannot reveal internal laws and have low processing efficiency. Few studies have used integrated learning methods to identify urban functional areas. In fact, considering the differences between the multi-source data used in the identification of urban functional areas, it is necessary to introduce integrated learning, so as to reveal the complex internal mechanism.

SUMMARY

A technical problem to be solved by the present disclosure is to explore the correlation between urban functional areas types and urban features, so as to map urban features to urban functional areas types.

In order to solve the above technical problem, the present disclosure proposes the following technical solution: an identification method of urban functional areas based on mixing degree of functions and integrated learning includes the following steps:

1) performing data acquisition and preprocessing: acquiring source data according to spatial differentiation and social differentiation of a city;
where, the preprocessing includes dividing urban functional areas, cleaning dirty data, and dividing study units;
the cleaning dirty data includes removing missing, incorrect, duplicate, or improperly formatted data from the source data;
the dividing urban functional areas includes dividing the city into the urban functional areas; and
the dividing study units includes forming a plurality of small closed parcels based on road network data of the city;
2) constructing 10 indicator features of an urban functional area identification system, where the indicator features are configured to describe the spatial differentiation and social differentiation of the city;
3) structuring the indicator features: acquiring, by a spatial statistical tool, the 10 indicator features corresponding to each parcel;
4) constructing an independent variable dataset: constructing an attribute set of each parcel based on the 10 indicator features corresponding to each parcel in step 3), and retaining a name of the corresponding parcel;
5) labeling response variables: forming a training dataset with some parcels, labeling corresponding urban functional areas, and forming a prediction set with remaining parcels;
6) dividing the training dataset into a plurality of training subsets according to the mixing degree of functions: incorporating parcels with same or similar mixing degree of functions into a same training subset, so as to form the plurality of training subsets according to the mixing degree of functions in ascending or descending order;
7) training a Stacking-based integrated learning model including a first level formed by four machine learning (ML) algorithms, namely random forest (RF), gradient boosting decision tree (GBDT), support vector machine (SVM), and back-propagation neural network (BPNN), and a second level formed by an extreme gradient boosting (XGBoost) algorithm: conducting separate trainings based on each training subset formed in step 6), and making a prediction based on the prediction set with same mixing degree of functions as the training subset; and
8) joining an attribute in one table to another table: relating a prediction result acquired in step 7) to the corresponding parcel by the name of each parcel, so as to complete the identification of the urban functional areas on each parcel.

Further, in the technical solution, the source data includes building data, ecological source data, bus stop data, subway station data, digital elevation model (DEM) data, online car-hailing demand data, Weibo check-in data, and mobile signal data; the building data, the ecological source data, the bus stop data, the subway station data, and the DEM data describe the spatial differentiation of the city; and the online car-hailing demand data, the Weibo check-in data, and the mobile signal data describe the social differentiation of the city.

The present disclosure has the following beneficial effects. The present disclosure divides the training dataset by grading the mixing degree of functions, and makes predictions based on the prediction dataset with corresponding mixing degree of functions, thus effectively improving the accuracy of each prediction set. The present disclosure provides an accurate identification method of urban functional areas by exploring the correlation between the urban functional area types and urban features and mapping the urban features to the urban functional areas types.

DETAILED DESCRIPTION OF THE EMBODIMENTS

Embodiment

Figure 1:
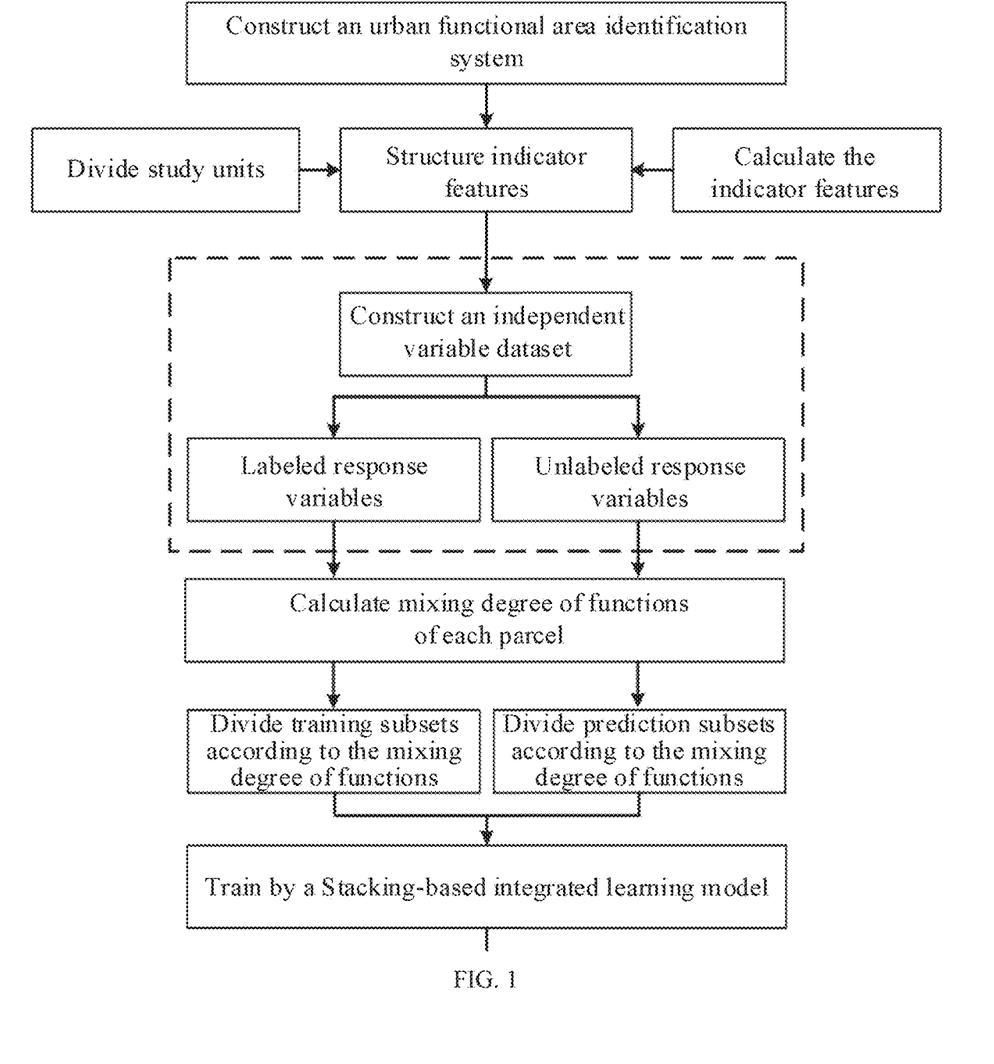
FIG. 1 is a flowchart of an identification method of urban functional areas based on mixing degree of functions and integrated learning according to an embodiment of the present disclosure.

This embodiment provides an identification method of urban functional areas based on mixing degree of functions and integrated learning. This embodiment selects the central urban area of Nanjing as the study area. As shown in FIG. 1, the method includes the following steps.

1) Data acquisition and preprocessing is performed, which is a data preparation process and is thus not shown in the figure. Source data are acquired according to spatial differentiation and social differentiation of the city.

Preferably, this study is conducted based on road division data acquired from OpenStreetmap (OSM). The spatial differentiation of Nanjing is depicted through building data, ecological source data, bus stop data, subway station data, and DEM data. The social differentiation of Nanjing is depicted through online car-hailing demand data, Weibo check-in data, and mobile signal data. The types, sizes, and sources of the data are shown in Table 1.

The preprocessing includes a process of dividing urban functional areas, a process of cleaning dirty data, and a process of dividing study units.

The process of cleaning dirty data includes a process of removing missing, incorrect, duplicate, or improperly formatted data from the source data.

The dirty data refers to data that is missing, incorrect, duplicate, or improperly formatted. The process of cleaning data refers to a process of removing dirty data from a database, which is an important step in data preprocessing. Through the Pandas library in Python 3.7.9, dirty data is removed from the mobile signal data, the Weibo check-in data, the online car-hailing demand data, and the urban point of interest (urban POI) data. The cleaning standards are shown in Table 2.

TABLE 2

| Mobile signal data cleaning standards | | |
|---|---|---|
| Data type | Dirty data type | Data cleaning standard |
| Mobile signal data | Missing data | Empty data in fields base, sex, Age_Class, Stay_Time_Class, Region, and Cen_Region |
| | Incorrect data | Data with a value that is not 1-8 in the field Stay_Time_Class; data with a value of 9 in the field Sex; and data with a value that is not 1-9 in the field Age_Class |
| | Duplicate data | Data with the same value in all the attribute fields |
| Weibo check-in data | Missing data | Empty data in fields Gender, Year, Month, Day, Hour, and Text |
| | Incorrect data | Data with a value that is not 1-12 in the field Month; data with a value that is not 1-31 in the field Day; and data with a value that is not 1-24 in the field Hour |
| | Duplicate data | Data with the same value in all the attribute fields |
| Online car-hailing | Missing data | Empty data in fields Demand, Time, Money, and urban POI_ID |

TABLE 1

| Sources of data | | | | |
|---|---|---|---|---|
| Data name | Data type | Data size | Number of entries | Data source |
| Urban POI | CSV | 425.00 MB | 237971 | Baidu Map Open Platform (https://lbsyun.baidu.com/) |
| Population density | Tiff | 37.40 MB | / | World population counts dataset (https://www.worldpop.org/) |
| Nighttime light | Tiff | 2.37 MB | / | Suomi National Polar-orbiting Partnership (NPP)/Visible Infrared Imaging Radiometer Suite (VIIRS) (http://eogdata.mines.edu/products/vnl/) |
| DEM | Tiff | 3.11 GB | / | United States Geological Survey (USGS) (https://earthexplorer.usgs.gov/) |
| Building | DWG | 266.00 MB | 245293 | Baidu Map Open Platform (https://lbsyun.baidu.com/) |
| Mobile signal | CSV | 1.59 GB | 5463239 | Provincial Geomatics Center of Jiangsu |
| Online car-hailing demand | CSV | 388.00 MB | 31022 | Kuaidadi data (http://v.kuaidadi.com/) |
| OSM data | Shapefile | 38.40 MB | 23904 | OpenStreetMap (https://www.openhistoricalmap.org/) |
| Weibo check-in | CSV | 1.03 GB | 1001017 | Weibo (https://open.weibo.com/) |
| Subway station | CSV | 344.00 KB | 159 | Baidu Map Open Platform (https://lbsyun.baidu.com/) |
| Bus stop | CSV | 12.30 MB | 5784 | Baidu Map Open Platform (https://lbsyun.baidu.com/) |

TABLE 2-continued

Mobile signal data cleaning standards

| Data type | Dirty data type | Data cleaning standard |
|---|---|---|
| demand data | Incorrect data | Data with a value that is not 1-24 in the field Time |
| | Duplicate data | Data with the same value in all the attribute fields |
| Urban POI data | Missing data | Empty data in fields Class, Location, Lon, and Lat |
| | Incorrect data | Data with a value that is not 1-8 in the field Lon; and data with a value that is not 1-8 in the field Lat |
| | Duplicate data | Data with the same value in all the attribute fields |

The process of dividing urban functional areas includes a process of dividing the city into the urban functional areas.

Urban functional areas are divided according to relevant plans or standards. For example, in this embodiment, the urban functional areas are divided according to the land use classification standards in GBT21010-2017 *Current Land Use Classification*. The first-class urban functional areas are divided according to residential land, industrial land, public service facilities land, commercial service facilities land, road traffic land, and other land. Some second-class land use types are adjusted. The religious and funeral land and tourism land under the special land and the green land and parks under the public service facilities land are classified as other land. The land for mining, rural roads, pipeline transportation, logistics and warehousing, military facilities, and embassies and consulates are excluded.

The process of dividing study units includes a process of forming a plurality of small closed parcels based on road network data of the city.

Figure 3:
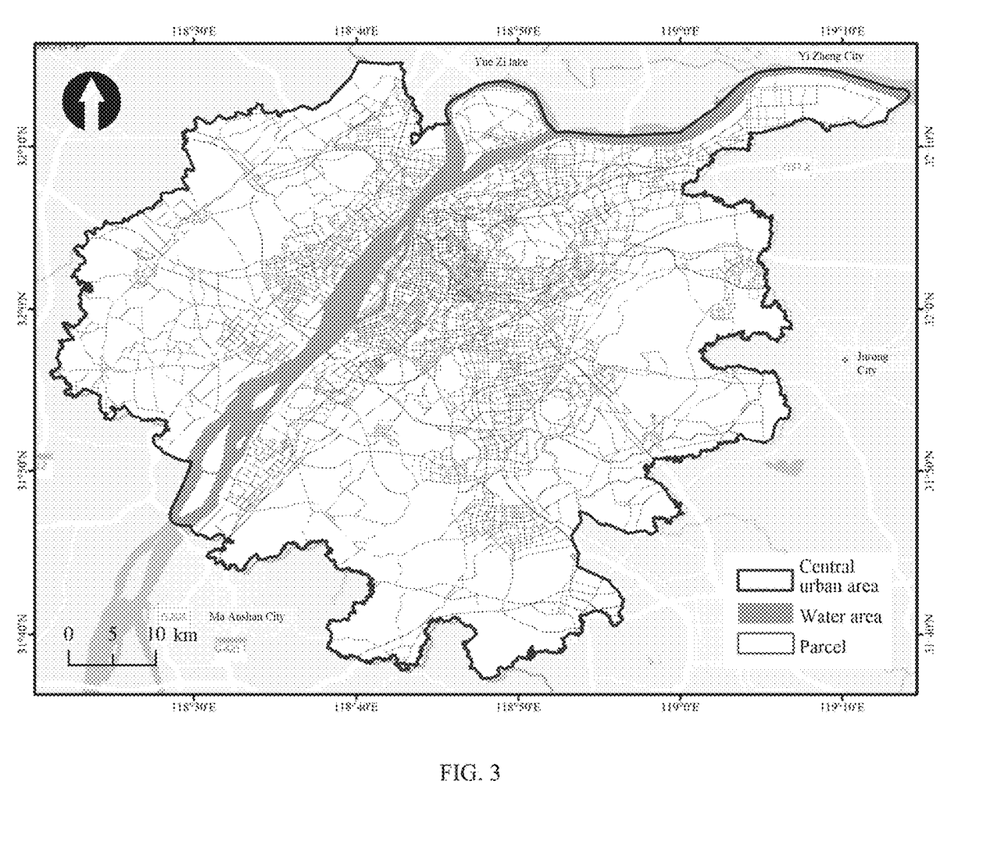
FIG. 3 shows parcels divided in a study area according to an embodiment of the present disclosure.

The division is based on the road data "gis_osm_railways_free" and "gis_osm_roads_free" downloaded from the OSM. Different grades of roads are selected based on the "fclass" attribute of the data. The attributes "primary", "primary_link", "secondary", "secondary_link", "tertiary", "tertiary_link", "trunk", "trunk_link", "cycleway", "motorway", and "motorway_link" are retained. Unclosed road sections are trimmed. Based on the remote sensing (RS) image of Nanjing acquired by the Sentinel-2 satellite after geographical registration, the roads under construction in the central urban area of Nanjing are supplemented through the Arcgis vectorization tool, thereby completing the road network of Nanjing. Finally, based on the river network data and road network data of Nanjing, the urban parcels of Nanjing are divided. Therefore, the parcels in the central urban area of Nanjing are enclosed by urban roads and urban river networks, and are single closed parcels. The division results are shown in FIG. 3.

2) 10 indicator features are constructed for an urban functional area identification system, where the indicator features are configured to describe the spatial differentiation and social differentiation of the city.

Figure 2:
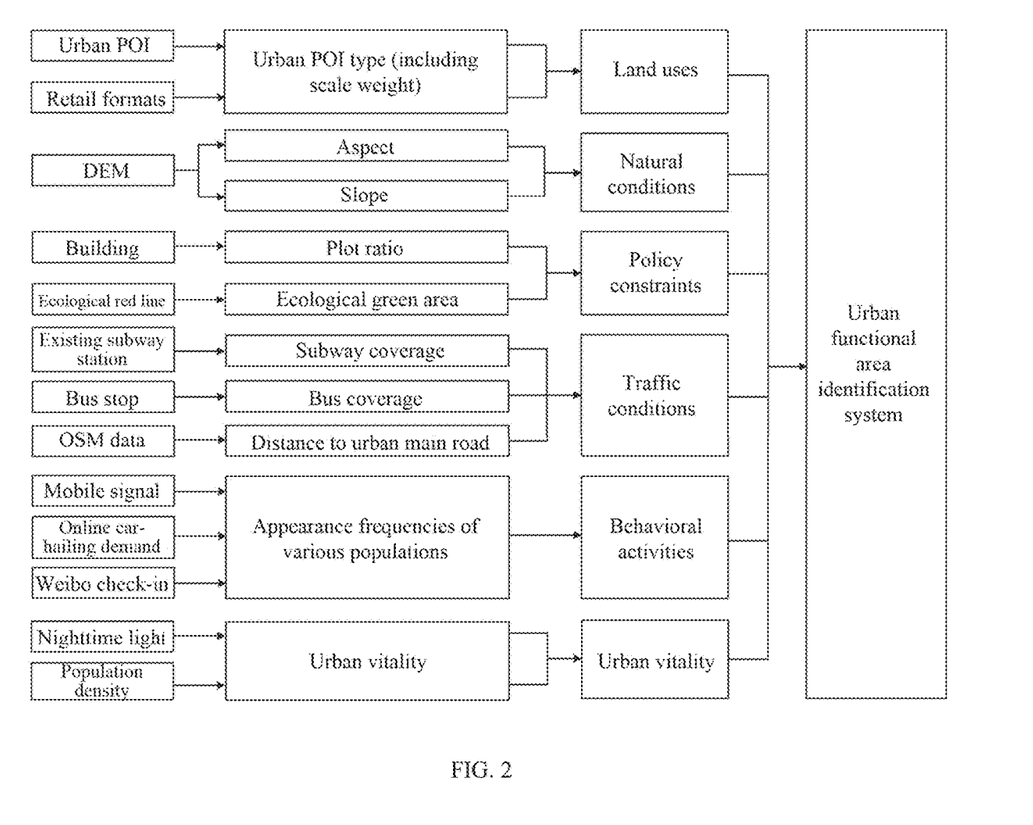
FIG. 2 shows correspondences of 10 indicator features according to an embodiment of the present disclosure.

Specifically, the 10 indicator features are constructed from 6 levels: land uses, natural conditions, policy constraints, traffic conditions, behavioral activities, and urban vitality. The indicator features include POI type (including scale weight and influence weight), aspect, slope, plot ratio, ecological green area, subway coverage, bus coverage, distance to urban main road, appearance frequencies of various populations, and urban vitality. The correspondences of the indicator features are shown in FIG. 2.

3) The indicator features are structured. The 10 indicator features corresponding to each parcel are acquired by a spatial statistical tool.

31) Land uses. According to the current Chinese standard GB/T18106-2010 *Classification of Retail Formats*, a scale weight is introduced to evaluate the scale and floor area of the urban POIs. The median of the area range is taken as the scale weight. For example, according to the retail formats, if the area range of a small supermarket is 200 m² to 1,999 m², the scale weight of the small supermarket is 1,100 m².

To describe the impact of different urban POIs, this embodiment uses an analytic hierarchy process (AHP), and introduces an influence weight to distinguish the impact differences of different urban POIs. An AHP-based structural model with decision objectives, intermediate layer elements, and alternatives is constructed through Yaahp software. By comparing the importance of various elements (urban POT types), a judgment matrix is determined and constructed, and the influence weights of different urban POI types are obtained.

The numerical values of the scale weight and influence weight differ largely. In order to achieve a reasonable weight reconciliation process, the scale weight and influence weight are normalized, and the normalized results of the scale weight and influence weight are added up to form a total weight. The calculation equations are as follows:

$$W_{1i}^* = \frac{W_{1i} - \min\{W_{1i}\}}{\max\{W_{1i}\} - \min\{W_{1i}\}} \quad \text{Eq. 1}$$

$$W_{2i}^* = \frac{W_{2i} - \min\{W_{2i}\}}{\max\{W_{2i}\} - \min\{W_{2i}\}} \quad \text{Eq. 2}$$

$$W_i = W_{1i}^* + W_{2i}^* \quad \text{Eq. 3}$$

$W_{1i}$ and $W_{2i}$ denote the scale weight and influence weight of an i-th type of urban POI, respectively; $W^*_{1i}$ and $W^*_{2i}$ denote the normalized results of the scale weight and influence weight of the i-th type of urban POI, respectively; and $W_i$ denotes the total weight of the i-th type of urban POI.

The weight calculation results of different types of urban POIs are shown in Table 3.

TABLE 3

Weights of urban POIs

| First class | Second class | Third class | Scale weight ($W_{1i}$) | Influence weight ($W_{2i}$) | Total weight ($W_i$) |
|---|---|---|---|---|---|
| Residential land | Residences | Villas | 7800 | 0.1481 | 0.5740 |
| | | Residence communities | 7800 | | 0.5740 |
| | Residence supporting facilities | Community centers | 3500 | 0.0185 | 1.0186 |
| Industrial land | Factories | Factories | 10000 | 0.0833 | 1.0833 |
| | Industrial parks | Industrial parks | 30000 | 0.0833 | 1.0833 |
| Public service facilities land | Life services | Post offices | 2000 | 0.0160 | 0.1016 |
| | | Ticket Offices | 100 | | 0.1016 |
| | | Talent centers and intermediaries | 200 | | 0.1016 |
| | | Offices | 200 | | 0.1016 |
| | | Travel agencies | 200 | | 0.1016 |
| | | Business halls | 200 | | 0.1016 |
| | | Logistics centers | 10000 | | 0.2032 |

TABLE 3-continued

Weights of urban POIs

| First class | Second class | Third class | Scale weight ($W_{1i}$) | Influence weight ($W_{2i}$) | Total weight ($W_i$) |
|---|---|---|---|---|---|
| | | Maintenance stations | 200 | | 0.1016 |
| | | Other life services | 100 | | 0.1016 |
| | Sports and leisure | Theaters | 800 | 0.0093 | 0.2019 |
| | | Golf | 800000 | | 0.1009 |
| | | Cinemas | 800 | | 0.3028 |
| | | Sports halls | 6000 | | 0.2019 |
| | | Vacation and recuperation places | 10000 | | 0.2019 |
| | Medical hygiene | General hospitals | 45000 | 0.0845 | 0.5423 |
| | | Specialized hospitals | 20000 | | 0.3254 |
| | | Clinics | 100 | | 0.1085 |
| | | Pharmacies (drugstores) | 100 | | 0.1085 |
| | Government agencies and social groups | Government agencies | 10000 | 0.0065 | 0.6040 |
| | | Social groups | 2000 | | 0.4027 |
| | Culture | Museums | 5000 | 0.0227 | 0.3068 |
| | | Archives | 2000 | | 0.1023 |
| | | Exhibition halls | 2000 | | 0.1023 |
| | | Libraries | 5000 | | 0.2045 |
| | | Art galleries | 4000 | | 0.1023 |
| | | Science and technology museums | 2000 | | 0.1023 |
| | | Cultural palaces | 2000 | | 0.1023 |
| | Scientific study and education | Scientific study institutions | 3000 | 0.0277 | 0.2055 |
| | | Higher education institutions | 100000 | | 0.3083 |
| | | Colleges and universities | 100000 | | 0.3083 |
| | | Middle schools | 30000 | | 0.0514 |
| | | Primary schools | 15000 | | 0.0514 |
| | | Kindergartens | 10000 | | 0.0514 |
| | | Training institutions | 1000 | | 0.0514 |
| Commercial service facilities land | Recreation and entertainment | Playgrounds | 20000 | 0.0339 | 0.3102 |
| | | Other leisure places | 100 | | 0.1034 |
| | | Karaoke bars | 1000 | | 0.1034 |
| | | Pubs | 800 | | 0.1034 |
| | | Internet bars | 500 | | 0.1034 |
| | | Chess and card rooms | 200 | | 0.1034 |
| | | Video game rooms | 500 | | 0.2068 |
| | Automotive services | Automobile maintenance | 800 | 0.0081 | 0.2520 |
| | | Car sales | 800 | | 0.2520 |
| | | Motorcycle services | 200 | | 0.2520 |
| | | Other automotive services | 500 | | 0.2520 |
| | Catering and accommodation | Restaurants | 300 | 0.0488 | 0.5244 |
| | | Hotels | 5000 | | 0.5244 |
| | Shopping services | Commercial streets | 50000 | 0.0662 | 0.3199 |
| | | Comprehensive shopping malls | 40000 | | 0.2132 |
| | | Supermarkets | 20000 | | 0.2132 |
| | | Building materials and home furnishing | 20000 | | 0.1066 |
| | | Exclusive shops | 500 | | 0.1066 |
| | | Convenience stores | 200 | | 0.1066 |
| | Companies | Office buildings | 50000 | 0.0096 | 0.2524 |
| | | Banks | 300 | | 0.2524 |
| | | Insurance securities | 300 | | 0.2524 |
| | | Companies | 2000 | | 0.2524 |
| Road traffic land | Road ancillary facilities | Service areas | 1000 | 0.0238 | 0.5119 |
| | | Toll gates | 100 | | 0.5119 |
| | Transportation facilities | Airport related | 500000 | 0.1429 | 0.4572 |
| | | Stations (trains, high-speed railways) | 100000 | | 0.2286 |
| | | Coach stations | 10000 | | 0.2286 |
| | | Subway stations | 100 | | 0.0572 |
| | | Ferry terminals | 10000 | | 0.1143 |
| | | Bus stops | 20 | | 0.0572 |
| Other land | Tourism land | Famous sceneries | 20000 | 0.0597 | 0.6359 |
| | | Memorial halls | 5000 | | 0.4239 |
| | Parks and green space | Urban squares | 10000 | 0.0978 | 0.6587 |
| | | Parks | 10000 | | 0.4391 |
| | Religious and funeral land | Churches | 500 | 0.0091 | 0.3027 |
| | | Temples | 1000 | | 0.4036 |
| | | Funeral facilities | 1000 | | 0.3027 |

Weight scores of the urban POIs on each parcel and proportions of the 6 urban functional area types on each parcel are calculated, and the urban functional area type of each parcel is determined through comparison. The calculation equation is as follows:

$$S_{ij} = \frac{\sum_{p=1}^{n} Q_p W_p}{\sum_{k=1}^{m} Q_k W_k} \quad \text{Eq. 4}$$

$S_{ij}$ denotes the weight score of a J-th urban functional area type on the r-th parcel. $Q_p$ denotes a number of urban POIs of the j-th urban functional area type (first class) on the i-th parcel. $W_p$ denotes a total weight of a p-th type of urban POIs (third class) of the j-th urban functional area type (first class) on the i-th parcel. n denotes a number of the p-th type of urban POIs (third class) of the j-th urban functional area type (first class) on the i-th parcel. $Q_k$ denotes the urban POI of a k-th urban functional area type (first class) on the i-th parcel. $W_k$ denotes a total weight of the k-th urban functional area type (first class) on the i-th parcel. m denotes a number of all urban POIs on the i-th parcel.

$$F_i = \max\{S_{ij}\} \quad \text{Eq. 5}$$

$F_i$ denotes the weight score of the urban functional area type with a highest weight score on the i-th parcel.

In the attribute table of a parcel vector file, the land use type of the i-th parcel is labeled as the urban functional area type represented by $F_i$, and the following values are assigned to the parcels to represent their urban functional area types: 1—residential land, 2—industrial land, 3—public service facilities land, 4—commercial service facilities land, 5—road traffic land, and 6—other land (Table 4).

TABLE 4

Label values of urban functional areas

| Urban functional area type | Label value |
|---|---|
| Residential land | 1 |
| Industrial land | 2 |
| Public service facilities land | 3 |
| Commercial service facilities land | 4 |
| Road traffic land | 5 |
| Other land | 6 |

32) Natural conditions are of great significance for distinguishing between agricultural land, construction land, and unused land, and can assist in the classification of urban functional areas on the construction land. For example, tourism land under other land is generally located near mountains, rivers, and lakes with large surface fluctuations. Slope and aspect are taken as indicators of natural conditions to distinguish other special land. The DEM data acquired by the Sentinel-2 satellite is analyzed through the slope and aspect tools of the Arcgis 10.3 spatial analyst toolset to acquire the slope and aspect data. The average values of the slope and aspect of each parcel are calculated and labeled.

33) Policy constraints. Policy guidance is an important aspect of optimizing urban functional areas. To deal with the irrationality of the urban functional structure, the planning guidance role of policies is becoming increasingly evident. Policies boost urban development by improving the suitability of urban functional spaces, and standardize the rational layout of urban functional spaces through limiting conditions. This embodiment selects ecologically important areas and plot ratio as indicators of policy constraints.

(1) Ecologically Important Areas

Construction land is prohibited from spreading to ecologically important areas of the city. Ecologically important areas have important resource, ecological, environmental, historical and cultural values, making them excellent tourism resources. Ecologically important areas can be used to distinguish other land from residential land, industrial land, commercial service facilities land, public service facilities land, and road traffic land. Strict identification labels are set for parcels within th ecologically important area. Therefore, an ecological constraint attribute column is newly created. Except for other land, no other urban functional area types are labeled in the ecologically important area. Parcels within the ecologically important area are labeled as other land (Table 4), and the attribute column of parcels outside the ecologically important area is assigned 0.

(2) Plot Ratio

The other important factor to consider is the plot ratio requirement of urban construction. Plot ratio is the core indicator for the division of urban functional areas, which refers to the ratio of the total floor area of a building to the area of a parcel on which the building is built. If 3 meters is determined as the height of a single floor, the plot ratio is calculated as follows:

$$\text{Far} = \frac{\sum_{i=1}^{n}\left(\frac{S_{bi}H_i}{3}\right)}{S_p} \qquad \text{Eq. 6}$$

Far denotes the plot ratio of the parcel; $S_{bi}$ denotes a bottom area of an i-th building on the parcel; $H_i$ denotes a height of the i-th building on the parcel; and $S_p$ denotes the area of the parcel.

Residential land, public service facilities land, commercial service facilities land, and industrial land are distinguished according to the plot ratio standard in the *Technical Regulations on Urban Planning and Management of Jiangsu Province* and the land use balance control standard for residential areas in the GB50180-93 *Code of Urban Residential Areas Planning & Design*. The scopes of new and old areas are determined in the overall urban planning. A plot ratio attribute column is newly created in the attribute table according to the plot ratio requirement, and the urban functional area types of the parcels are labeled, as shown in Table 5.

TABLE 5

Plot ratio

| Urban functional area type | | Plot ratio New area | Plot ratio Old area |
|---|---|---|---|
| Residential land | Low-rise | 1.1 | 1.2 |
| | Multi-story | 1.7 | 1.8 |
| | Medium-rise | 2.2 | 2.4 |
| | High-rise | 3.5 | 3.5 |
| Public service facilities land | Multi-story | 2.5 | 3.0 |
| | High-rise | 5.0 | 6.0 |
| Commercial service facilities land | Multi-story | 3.5 | 4.0 |
| | High-rise | 5.5 | 6.5 |
| Industrial land | Low-rise | 0.7-1.2 | 1.0-1.5 |
| | Multi-story | 1.0-2.0 | 1.2-2.5 |

34) Traffic conditions determine the flow of residents and goods within the city to a certain extent. The travel radius of residents and the transportation distance of goods have a profound impact on the spatial structure and texture of the city. The spatial structure and texture of the city determine the spatial heterogeneity of traffic conditions. Due to the differences in carrying functions, different types of urban functional areas have different requirements for traffic conditions. This embodiment selects three types of traffic data, namely urban main roads, subway stations, and bus stops to measure the spatial heterogeneity of traffic conditions. The distance to urban main road, the coverage of subway stations, and the coverage of bus stops drive the evolution of urban morphology and texture.

Compared to other urban functional area types, residential land, commercial service facilities land, and public service facilities land have higher coverage rates of subway stations and bus stops, and have a higher demand for transportation facilities accessible for pedestrians. In the calculation of the subway station coverage, the number of subway stations accessible by walking 500 meters within the parcel is calculated through the buffer analysis tool in Arcgis 10.3. In the calculation of the bus stop coverage, the number of bus stops accessible by walking 350 meters within the parcel is calculated through the buffer analysis tool in Arcgis 10.3. Industrial land has a large demand for logistics. If a parcel is close to an urban main road and connected to a highway, the transportation of the parcel is convenient and fast for efficient input of production materials and efficient output of products. In the calculation of the distance to an urban main road, a Euclidian distance from the parcel to the urban main road is analyzed through the distance analysis tool in Arcgis 10.3.

35) Behavioral activities. In this embodiment, the mobile signal data, the Weibo check-in data, and the online car-hailing data that provide masked user information attributes are all in the format of comma-separated values (CSV) files, with a large data size and complex data structure. In the user portrait part, based on the Python 3.7.9 environment, software packages such as Pandas, Shapely, and Geopandas are called for data cleaning, data structuring, and data integration, thereby improving processing efficiency.

The behavioral activities of residents are mainly measured by calculating the appearance frequencies of three types of user populations on each parcel. Firstly, the data are divided through data attributes. Each type of data divided represents a certain type of user population, and the data all include location information. Secondly, the appearance frequencies of each type of user population on the parcel are calculated through the spatial join tool of Arcgis. Finally, the spatial data of the parcel is acquired, including an attribute table about the appearance frequencies of each type of user population on the parcel. The specific division of the three types of user populations is as follows.

The mobile signal user population mainly has three attributes, namely gender, stay time, and age. There are two genders, male and female. The stay time is used to distinguish between permanent residents and temporary residents, and is divided into less than 7 days and more than 7 days. The age is used to distinguish between social statuses of the population, and is divided into less than 25 years old, 25-60 years old, and greater than 60 years old. The population less than 25 years old is defined as school-age population, the population aged 25-60 is defined as working-age population, and the population over the age of 60 is defined as retired population. According to the attributes of the mobile signal population, 12 categories of the mobile signal population are formed through cross combination, and 7 categories of the mobile signal population are retained, as shown in Table 6. The retained categories of the mobile signal population include permanent working men (male, stay longer than 7 days, 25-60 years old), permanent working women (female, stay longer than 7 days, 25-60 years old), temporary working-age population (stay longer than 7 days, 25-60 years old), permanent retired men (male, stay longer than 7 days, over 60 years old), permanent retired women (female, stay longer than 7 days, over 60 years old), and school-age population (stay longer than 7 days, under 25 years old).

The Weibo user population mainly has two attributes, namely gender and check-in time. There are two genders, male and female. The check-in time includes 7:00-20:00 and 20:00-7:00 next day, which are corresponding to daytime check-in data and nighttime check-in data, respectively. According to the attributes of the Weibo user population, four categories of the Weibo population are formed through cross combination, as shown in Table 6. The four categories of the Weibo population include: daytime check-in male (male, check-in time 7:00-20:00), daytime check-in female (male, check-in time 7:00-20:00), nighttime check-in male (male, check-in time 20:00-7:00 next day), and nighttime check-in female (female, check-in time 20:00-7:00 next day).

The online car-hailing user population has two attributes, namely, hailing time and hailing day. The hailing time includes 7:00-9:00, 9:00-16:00, 16:00-20:00, 21:00-24:00, and 00:00-24:00, which represent morning peak, working time, evening peak, nighttime, and all day, respectively. The hailing day includes weekends and weekdays. Based on the attributes of the online car-hailing user population and the purpose of the study, 10 categories of the mobile signal user population are formed through cross combination, and 6 categories of the mobile signal user population are retained, as shown in Table 6. The retained categories of the mobile signal user population include: early peak hailing population (hailing time: 7:00-9:00; hailing day: weekdays), evening peak hailing population (hailing time: 16:00-20:00; hailing day: weekdays), working time hailing population (hailing time: 9:00-16:00; hailing day: weekdays), nighttime hailing population (hailing time: 21:00-24:00; hailing day: weekdays), weekdays hailing population (hailing time: 00:00-24:00; hailing day: weekdays), and weekends hailing population (hailing time: 00:00-24:00; hailing day: weekends).

TABLE 6

User portraits

| User type | Attribute | | | |
|---|---|---|---|---|
| | Users | Gender | Age | Stay time (day) |
| Mobile signal user population | Permanent working-age population | Male | 25-60 | >7 |
| | | Female | 25-55 | >7 |
| | Temporary working-age population | Male/female | 25-60 | <7 |
| | Retired population | Male | >60 | >7 |
| | | Female | >55 | >7 |
| | School-age population | Male/female | 6-24 | >7 |

| | Users | Gender | Check-in time |
|---|---|---|---|
| Weibo user population | Daytime check-in male | Male | 7:00-20:00 |
| | Daytime check-in female | Female | 7:00-20:00 |
| | Nighttime check-in male | Male | 20:00-7:00 next day |
| | Nighttime check-in female | Female | 20:00-7:00 next day |

| | Users | Hailing time | Hailing day |
|---|---|---|---|
| Online car-hailing user population | Early peak hailing population | 7:00-9:00 | Weekdays |
| | Evening peak hailing population | 16:00-20:00 | Weekdays |

TABLE 6-continued

User portraits

| User type | Attribute | | |
|---|---|---|---|
| | Working time hailing population | 9:00-16:00 | Weekdays |
| | Nighttime hailing population | 21:00-24:00 | Weekdays |
| | Weekdays hailing population | 00:00-24:00 | Weekdays |
| | Weekends hailing population | 00:00-24:00 | Weekends |

36) Urban vitality. In order to comprehensively analyze urban vitality during daytime and nighttime based on dynamic differences of urban vitality during daytime and nighttime, this study uses the NPP/VIIRS nighttime lights dataset and the WorldPop population density dataset to measure urban vitality. The average values of nighttime light density and population density of each parcel are calculated through spatial statistics, and are added up to form the urban vitality value of each parcel.

4) An independent variable dataset is constructed. An attribute set of each parcel is constructed based on the 10 indicator features corresponding to each parcel in step 3), and a name of the corresponding parcel is retained.

The urban POIs of Nanjing are assigned based on the scale weight and influence weight provided in Table 3. According to Eq. 4, the proportion of each urban functional area type on each parcel in the central urban area of Nanjing is calculated. According to Eq. 5, the urban functional area type with the highest proportion on each parcel is acquired, and the parcel is labeled as the urban functional area type with the highest proportion. Based on the DEM data of Nanjing acquired by the Sentinel-2 satellite in July 2020, the slope and aspect data of the central urban area of Nanjing are acquired through slope analysis and aspect analysis. According to the policy constraints, the calculation results of the ecological green area scope and the plot ratio of the parcel in the central urban area of Nanjing are acquired. Through spatial analysis, the calculation results of the subway station coverage, the bus stop coverage, and the distance to the urban main road are acquired. According to the user statistics method, statistics are conducted on the mobile signal user population, the Weibo check-in user population, and the online car-hailing user population on each single parcel in the central urban area of Nanjing. According to the content of 3.3.2, the average values of nighttime light density and population density of each single parcel are calculated.

5) Response variables are labeled. A training dataset is formed with some parcels, corresponding urban functional areas are labeled, and a prediction set is formed with remaining parcels.

Based on field survey of land uses, visual interpretation of RS images, and determination through street view maps, the urban functional area types of a plurality of parcels (q parcels) are labeled in the 25-th column of the independent variable dataset. The label values of the urban functional area types are provided in Table 7: Label values of urban functional areas. Finally, a q*25 training dataset is formed, and the remaining parcels (k-q parcels) that do not include the urban functional area type in the 25-th column form a prediction dataset, which is not labeled

TABLE 7

Label values of urban functional areas

| Urban functional area type | Label value |
|---|---|
| Residential land | 1 |
| Industrial land | 2 |
| public service facilities land | 3 |
| Commercial service facilities land | 4 |
| Road traffic land | 5 |
| Other land | 6 |

6) The training dataset is divided into a plurality of training subsets according to the mixing degree of functions: parcels with same or similar mixing degree of functions are incorporated into a same training subset, so as to form the plurality of training subsets according to the mixing degree of functions in ascending or descending order.

The mixing degree of functions directly affects the functional identification of the parcel. A greater mixing degree of functions indicates a more complex functional identification mechanism of the parcel.

The mixing degree of residential land, public service facilities land, commercial service facilities land, road traffic land, industrial land, and other land within a single parcel refers to the mixing degree of functions of the parcel. A greater mixing degree of functions indicates more varied land uses of the parcel but poorer integrated learning and training effects. Based on the urban POI data, the mixing degree of functions of the parcel is calculated as follows:

$$H_{parcel} = -\sum_{i=1}^{n} P_i \times \ln P_i \qquad \text{Eq. 7}$$

$H_{parcel}$ denotes the mixing degree of functions of the parcel; n denotes a total number of urban POI types within the parcel; and $P_i$ denotes a proportion of the i-th type of urban POT within the parcel to the total number of urban POI types. The urban POI types are shown in the table below.

TABLE 8

Urban POI types

| Land uses | First-class urban POIS | Second-class urban POIs |
|---|---|---|
| Residential land | Residences | Villas |
| | | Residence communities |
| | Residence supporting facilities | Community centers |
| Industrial land | Factories | Factories |
| | Industrial parks | Industrial parks |
| public service facilities land | Life services | Post offices |
| | | Ticket Offices |
| | | Talent centers and intermediaries |
| | | Offices |
| | | Travel agencies |
| | | Business halls |
| | | Logistics centers |

TABLE 8-continued

Urban POI types

| Land uses | First-class urban POIS | Second-class urban POIs |
|---|---|---|
| | | Maintenance stations |
| | | Other life services |
| | Sports and leisure | Theaters |
| | | Golf |
| | | Cinemas |
| | | Sports halls |
| | | Vacation and recuperation places |
| | Medical hygiene | General hospitals |
| | | Specialized hospitals |
| | | Clinics |
| | | Pharmacies (drugstores) |
| | Government agencies and social groups | Government agencies |
| | | Social groups |
| | Culture | Museums |
| | | Archives |
| | | Exhibition halls |
| | | Libraries |
| | | Art galleries |
| | | Science and technology museums |
| | | Cultural palaces |
| | Scientific study and education | Scientific study institutions |
| | | Higher education institutions |
| | | Colleges and universities |
| | | Middle schools |
| | | Primary schools |
| | | Kindergartens |
| | | Training institutions |
| Commercial service facilities land | Recreation and entertainment | Playgrounds |
| | | Other leisure places |
| | | Karaoke bars |
| | | Pubs |
| | | Internet bars |
| | | Chess and card rooms |
| | | Video game rooms |
| | Automotive services | Automobile maintenance |
| | | Car sales |
| | | Motorcycle services |
| | | Other automotive services |
| | Catering and accommodation | Restaurants |
| | | Hotels |
| | Shopping services | Commercial streets |
| | | Comprehensive shopping malls |
| | | Supermarkets |
| | | Building materials and home furnishing |
| | | Exclusive shops |
| | | Convenience stores |
| | Companies | Office buildings |
| | | Banks |
| | | Insurance securities Companies |
| Road taffic land | Road ancillary facilities | Service areas |
| | | Toll gates |
| | Transportation facilities | Airport related |
| | | Stations (trains, high-speed railways) |
| | | Coach stations |
| | | Subway stations |
| | | Ferry terminals |
| | | Bus stops |
| Other land | Tourism land | Famous sceneries |
| | | Memorial halls |
| | Parks and green space | Urban squares |
| | | Parks |
| | Religious and funeral land | Churches |
| | | Temples |
| | | Funeral facilities |

7) A Stacking-based integrated learning model is trained, which includes a first level formed by four machine learning (ML) algorithms, namely random forest (RF), gradient boosting decision tree (GBDT), support vector machine (SVM), and back-propagation neural network (BPNN), and a second level formed by an extreme gradient boosting (XGBoost) algorithm. Separate trainings are conducted based on each training subset formed in step 6), and a prediction is made based on the prediction set with same mixing degree of functions as the training subset.

According to Eq. 7, the mixing degree of functions of the parcel in the central urban area of Nanjing is calculated as 0-1. According to the mixing degree of functions, the training dataset is divided into 12 training subsets $S_1$ to $S_{12}$. The mixing degree of functions within the same training subset is within the same range. The mixing degree of functions of the training subsets $S_1$ to $S_{12}$ gradually decreases. Similarly, there are 12 prediction sets divided according to the mixing degree of functions, namely $P_1$ to $P_{12}$. The mixing degree of functions of the prediction sets $P_1$ to $P_{12}$ also gradually decreases. Geographical division is conducted based on the mixing degree of functions, and separate trainings are conducted based on the 12 training subsets and the corresponding prediction sets. The accuracy of the 12 training subsets of a training dataset without geographical division is calculated, as shown in Table 9. The mixing degree of functions reflects the complexity of the urban functional area types within the parcel, and the urban features and residents' behavior rules within the parcel of the same mixing degree of functions are similar. Therefore, it is necessary to divide the training dataset into a plurality of training subsets according to the mixing degree of functions and conduct separate trainings. Through divisional trainings, the accuracy is significantly improved.

Overall, urban development is uneven, and the mixing degree of functions varies greatly. To identify the urban functional area types in a large area, it is necessary to split the training dataset according to the mixing degree of functions. The training dataset is divided into a plurality of training subsets based on the mixing degree of functions, and the mixing degree of functions of the same training subset is similar. Separate trainings are conducted on each training subset, and prediction is conducted based on the prediction set with the same mixing degree of functions as the training subset.

TABLE 9

Comparison of integrated learning accuracy of training subsets with different mixing degree of functions

| Divisional | $S_1$ | $S_2$ | $S_3$ | $S_4$ | $S_5$ | $S_6$ | $S_7$ | $S_8$ | $S_9$ | $S_{10}$ | $S_{11}$ | $S_{12}$ |
|---|---|---|---|---|---|---|---|---|---|---|---|---|
| √ | 0.713 | 0.714 | 0.740 | 0.751 | 0.779 | 0.780 | 0.780 | 0.811 | 0.821 | 0.821 | 0.833 | 0.849 |
| × | 0.667 | 0.680 | 0.719 | 0.730 | 0.766 | 0.781 | 0.786 | 0.813 | 0.813 | 0.818 | 0.829 | 0.841 |

8) An attribute in one table is joined to another table. A prediction result acquired in step 7) is related to the corresponding parcel by the name of each parcel, so as to complete the identification of the urban functional areas on each parcel.

Figure 4:
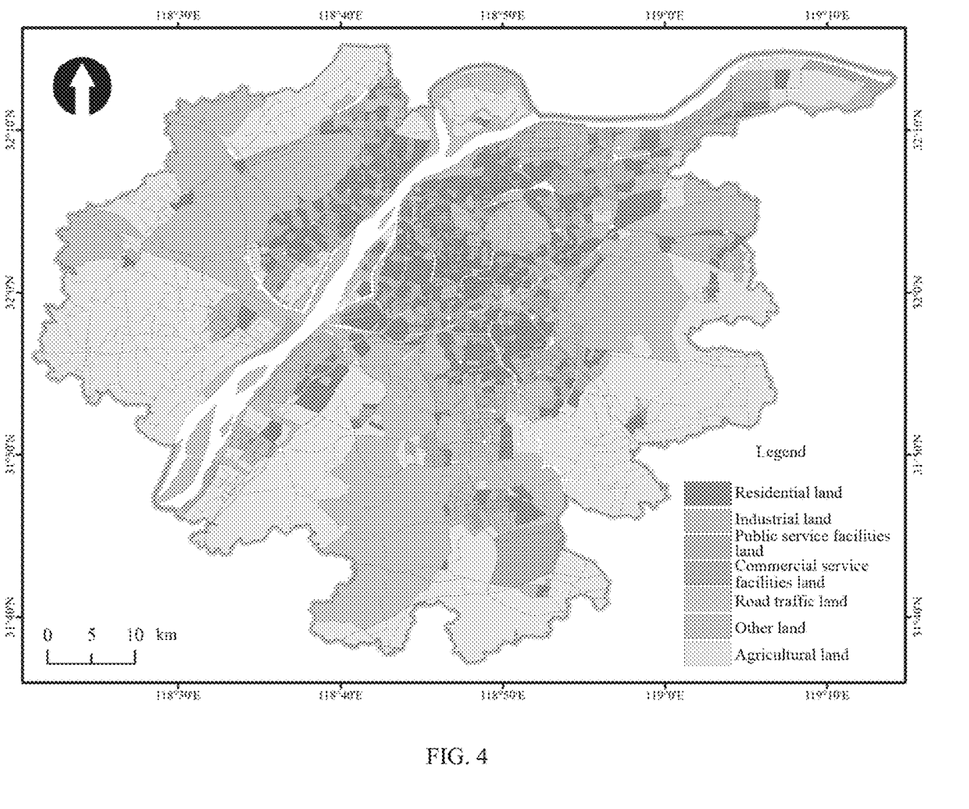
FIG. 4 shows urban functional areas identified in the study area according to the embodiment of the present disclosure.

The visualized identification results of the urban functional areas in the central urban area of Nanjing are shown in FIG. 4. In this study, the parcels identified include: 2,007 parcels of residential land, accounting for 34.1%; 624 parcels of industrial land, accounting for 10.6%; 1,089 parcels of public service facilities land, accounting for 18.5%; 1,065 parcels of commercial service facilities land, accounting for 18.0%; 124 parcels of road traffic land, accounting for 2.1%; and 986 parcels of other land, accounting for 16.7%.

What is claimed is:

1. A non-transitory computer readable storage medium containing computer executable instructions, which when executed configure at least one computer processor to perform an identification method of urban functional areas based on mixing degree of functions and integrated learning, the identification method comprising the following steps:
  1) performing, using the at least one computer processor, data acquisition and data preprocessing: acquiring source data according to spatial differentiation and social differentiation of a city;
  wherein the data preprocessing comprises dividing urban functional areas, cleaning dirty data, and dividing study units;
  the cleaning dirty data comprises removing missing, incorrect, duplicate, or improperly formatted data from the source data in a database, the cleaning of the dirty data improving processing efficiency;
  the dividing urban functional areas comprises dividing the city into the urban functional areas; and
  the dividing study units comprises forming a plurality of small closed parcels based on road network data of the city;
  2) constructing, using the at least one computer processor, 10 indicator features of an urban functional area identification system, wherein the indicator features are configured to describe the spatial differentiation and the social differentiation of the city;
  3) structuring, using the at least one computer processor, the indicator features: acquiring, by a spatial statistical tool, the 10 indicator features corresponding to each parcel, the structuring improving processing efficiency;
  4) constructing, using the at least one computer processor, an independent variable dataset: constructing an attribute set of each parcel based on the 10 indicator features corresponding to each parcel in step 3), and retaining a name of the corresponding parcel;
  5) labeling, using the at least one computer processor, response variables: forming a training dataset with some parcels, labeling corresponding urban functional areas, and forming a prediction set with remaining parcels;
  6) dividing, using the at least one computer processor, the training dataset into a plurality of training subsets according to the mixing degree of functions: incorporating parcels with same or similar mixing degree of functions into a same training subset, so as to form the plurality of training subsets according to the mixing degree of functions in ascending or descending order;
  7) training, using the at least one computer processor, a Stacking-based integrated learning model comprising a first level formed by four machine learning (ML) algorithms, namely random forest (RF), gradient boosting decision tree (GBDT), support vector machine (SVM), and back-propagation neural network (BPNN), and a second level formed by an extreme gradient boosting (XGBoost) algorithm: conducting separate trainings based on each training subset formed in step 6), and making a prediction based on the prediction set with same mixing degree of functions as the training subset, wherein the training comprises conducting a plurality of separate machine learning trainings on the plurality of training subsets to improve the accuracy of predictions;
  8) joining, using the at least one computer processor, an attribute in one table to another table: relating a prediction result acquired in step 7) to the corresponding parcel by the name of each parcel, so as to complete the identification of the urban functional areas on each parcel; and
  determining influence weights of different urban Points of Interest (POI) using the following equations:

$$W^*_{1i} = \frac{W_{1i} - \min\{W_{1i}\}}{\max\{W_{1i}\} - \min\{W_{1i}\}} \quad \text{Eq. 1}$$

$$W^*_{2i} = \frac{W_{2i} - \min\{W_{2i}\}}{\max\{W_{2i}\} - \min\{W_{2i}\}} \quad \text{Eq. 2}$$

$$W_i = W^*_{1i} + W^*_{2i} \quad \text{Eq. 3}$$

wherein $W_{1i}$ and $W_{2i}$ denote the scale weight and influence weight of an i-th type of urban POI, respectively; $W^*_{1i}$ and $W^*_{2i}$ denote the normalized results of the scale weight and influence weight of the i-th type of urban POI, respectively; and $W_i$ denotes the total weight of the i-th type of urban POI.

2. The non-transitory computer readable storage medium according to claim 1, wherein
the source data comprises building data, ecological source data, bus stop data, subway station data, digital elevation model (DEM) data, online car-hailing demand data, Weibo check-in data, and mobile signal data;
the building data, the ecological source data, the bus stop data, the subway station data, and the DEM data describe the spatial differentiation of the city; and
the online car-hailing demand data, the Weibo check-in data, and the mobile signal data describe the social differentiation of the city.

3. The non-transitory computer readable storage medium according to claim 1, wherein
the cleaning dirty data comprises removing the missing, incorrect, duplicate, or improperly formatted data from the source data of the social differentiation of the city.

4. The non-transitory computer readable storage medium according to claim 1, wherein
road data is acquired from OpenStreetMap (OSM), a part of grade roads are retained, and an unclosed road section is trimmed.

5. The non-transitory computer readable storage medium according to claim 1, wherein
the indicator features comprise point of interest (POI) type, aspect, slope, plot ratio, ecological green area, subway coverage, bus coverage, distance to urban main road, appearance frequencies of various populations, and urban vitality.

* * * * *